United States Patent
Hall

(10) Patent No.: US 11,606,481 B2
(45) Date of Patent: Mar. 14, 2023

(54) REDUCING JUDDER USING MOTION VECTORS

(71) Applicant: DisplayLink (UK) Limited, Cambridge (GB)

(72) Inventor: Trevor Hall, Twickenham Middlesex (GB)

(73) Assignee: DISPLAYLINK (UK) LIMITED, Cambridge (GB)

( * ) Notice: Subject to any disclaimer, the term of this patent is extended or adjusted under 35 U.S.C. 154(b) by 454 days.

(21) Appl. No.: 16/635,271

(22) PCT Filed: Jul. 24, 2018

(86) PCT No.: PCT/GB2018/052084
§ 371 (c)(1),
(2) Date: Jan. 30, 2020

(87) PCT Pub. No.: WO2019/025760
PCT Pub. Date: Feb. 7, 2019

(65) Prior Publication Data
US 2021/0075937 A1   Mar. 11, 2021

(30) Foreign Application Priority Data
Aug. 1, 2017 (GB) ..................................... 1712389

(51) Int. Cl.
*H04N 19/51* (2014.01)
*H04N 5/14* (2006.01)
*H04N 5/21* (2006.01)

(52) U.S. Cl.
CPC ............... *H04N 5/144* (2013.01); *H04N 5/21* (2013.01)

(58) Field of Classification Search
CPC .. G09G 2320/106; G09G 5/00; H04N 19/132; H04N 19/137; H04N 19/172; H04N 19/65; H04N 5/144; H04N 5/21
See application file for complete search history.

(56) References Cited

U.S. PATENT DOCUMENTS

| 10,595,025 B2* | 3/2020 | Lee ...................... H04L 1/1838 |
| 2014/0211860 A1* | 7/2014 | Zhao ................... H04N 19/127 |
| | | 375/240.27 |

(Continued)

FOREIGN PATENT DOCUMENTS

EP   2232878   9/2010

OTHER PUBLICATIONS

Search Report for Application No. GB1712389.4, dated Jan. 19, 2018, 1 page.

(Continued)

*Primary Examiner* — Phuc H Tran
(74) *Attorney, Agent, or Firm* — Paradice & Li LLP

(57) ABSTRACT

A method at a client device for mitigating motion judder in frames of an image due to display data for a particular frame being unavailable at a required time at the client device. The method involves receiving (S35) the display data for a current frame n, and generating (S3Y3) the current frame n from the received display data. Motion vectors for some elements of the image in the current frame n are obtained (S3Y1). If it is determined that display data for the next frame n+1 is not available, the next frame n+1 is generated (S3N4) from either the current frame n or a previous frame n−m, where m=1, 2, 3, etc, adjusted based on an extrapolation (S3N3) of the motion vectors for the elements of the image in either the current frame n or the previous frame n−m.

20 Claims, 10 Drawing Sheets

(56) References Cited

U.S. PATENT DOCUMENTS

2014/0269918 A1* 9/2014 van der Laan ...... H04N 19/587
                                                        375/240.12
2019/0180454 A1* 6/2019 Choudhury ............ H04N 19/46

OTHER PUBLICATIONS

International Search Report, for International Application No. PCT/GB2018/052084, dated Nov. 2, 2018 (2 pages).

* cited by examiner

REDUCING JUDDER USING MOTION VECTORS

CROSS REFERENCE TO RELATED APPLICATIONS

This application claims the benefit of PCT/GB2018/052084 filed Jul. 24, 2018, having a priority claim to British Patent Application No. 1712389.4 filed Aug. 1, 2017. The contents of these prior patent documents are incorporated herein by reference.

BACKGROUND

When a display control device is connected to a host computer using a wired connection, the delivery of display data is generally predictable and reliable. The same cannot be said of a wireless connection, which can introduce large data delays and sometimes catastrophic loss of data.

Currently, if a frame is dropped or significantly delayed during transmission there is no way to recreate it, so the previous frame is repeated. This results in parts of the image remaining in the same place for multiple frames and then suddenly moving (or jumping) to a new place in the image as a new frame that may be several frames ahead of the repeated frame is received and displayed. This is perceived by the user as "judder" and can cause significant discomfort, especially in virtual-reality systems where low latency and high detail of display data are very important.

The invention aims to solve or at least mitigate this problem.

SUMMARY

Accordingly, in one aspect, the invention provides a method for mitigating motion judder in frames of an image to be displayed on a display device due to display data for a particular frame being unavailable at a required time at a client device that processes the display data to generate the frames of the image for display, wherein the display data is normally received by the client device over a transmission medium from a host device where the display data is generated, the method comprising:

receiving, at the client device, display data for at least a current frame n;

generating, at the client device, at least the current frame n from the received display data;

obtaining, at the client device, motion vectors for at least some elements of the image in the current frame n;

determining, at the client device, whether display data for a next frame n+1 is available to process; and if it is determined that the display data for the next frame n+1 is not available to process, generating the next frame n+1 from either the current frame n or a previous frame n−m, where m=1, 2, 3, etc, adjusted based on an extrapolation of the motion vectors for the at least some elements of the image in either the current frame n or the previous frame n−m, where m=1, 2, 3, etc, to the image in next frame n+1.

In one embodiment, obtaining the motion vectors at the client device comprises receiving the motion vectors for current frame n from the host device together with the display data for current frame n. Alternatively, obtaining the motion vectors at the client device comprises determining, at the client device, the motion vectors for current frame n by comparing positions of the at least some elements of the image in current frame n with positions of the at least some elements of the image in a previous frame n−m, where m=1, 2, 3, etc.

Preferably, the extrapolation of the motion vectors is produced at the client device prior to determining whether the display data for a next frame n+1 is available to process and stored in a memory at the client device to be used if it is determined that the display data for the next frame n+1 is not available to process.

In one embodiment, the extrapolation of the motion vectors is produced using motion vectors from at least some elements of the image in the current frame n and from motion vectors from the at least some elements of the image in at least one previous frame n−1.

The method may further comprise determining whether the image has an area that has a contrast level below a predetermined threshold and motion vectors are not obtained for the area.

The method may further comprise determining whether the image has an area that has a contrast level below a predetermined threshold and wherein the extrapolation of the motion vectors is not produced for the area.

The method may further comprise determining whether the image has an area that a contrast level above a predetermined threshold and motion vectors are only obtained for the area.

The method may further comprise determining whether the image includes an area that has a contrast level above a predetermined threshold and wherein the extrapolation of the motion vectors is only produced for the area.

In a second aspect, the invention provides a client device configured to perform a method as described above.

Preferably, the client device comprises a Virtual Reality or an Augmented Reality device to be worn by a user.

An aspect of the invention may provide a display system comprising a client device and a host device.

According to another aspect, the invention provides a method for approximating a lost frame using the optical flow of pixels in previous frames, comprising:

Comparing a current and one or more previous frames (Frame$_n$ and Frame$_{n-1}$) to generate motion vectors between them;

Extrapolating the motion vectors to produce an extrapolated motion vector for a next frame; and Moving the image data in the current frame (Frame$_n$) as indicated by the extrapolated motion vectors to generate the next frame (Frame$_{n+1}$)

This method may recreate an approximation of a missing frame (Frame$_{n+1}$) by estimating how the image elements within it will have moved based on their previous movement. This will allow the system to continue an illusion of movement, even if exact fidelity is lost, thereby at least mitigating judder.

BRIEF DESCRIPTION OF THE DRAWINGS

Embodiments of the invention will now be more fully described, by way of example, with reference to the drawings, of which.

DETAILED DESCRIPTION OF THE DRAWINGS

Figure 1A:
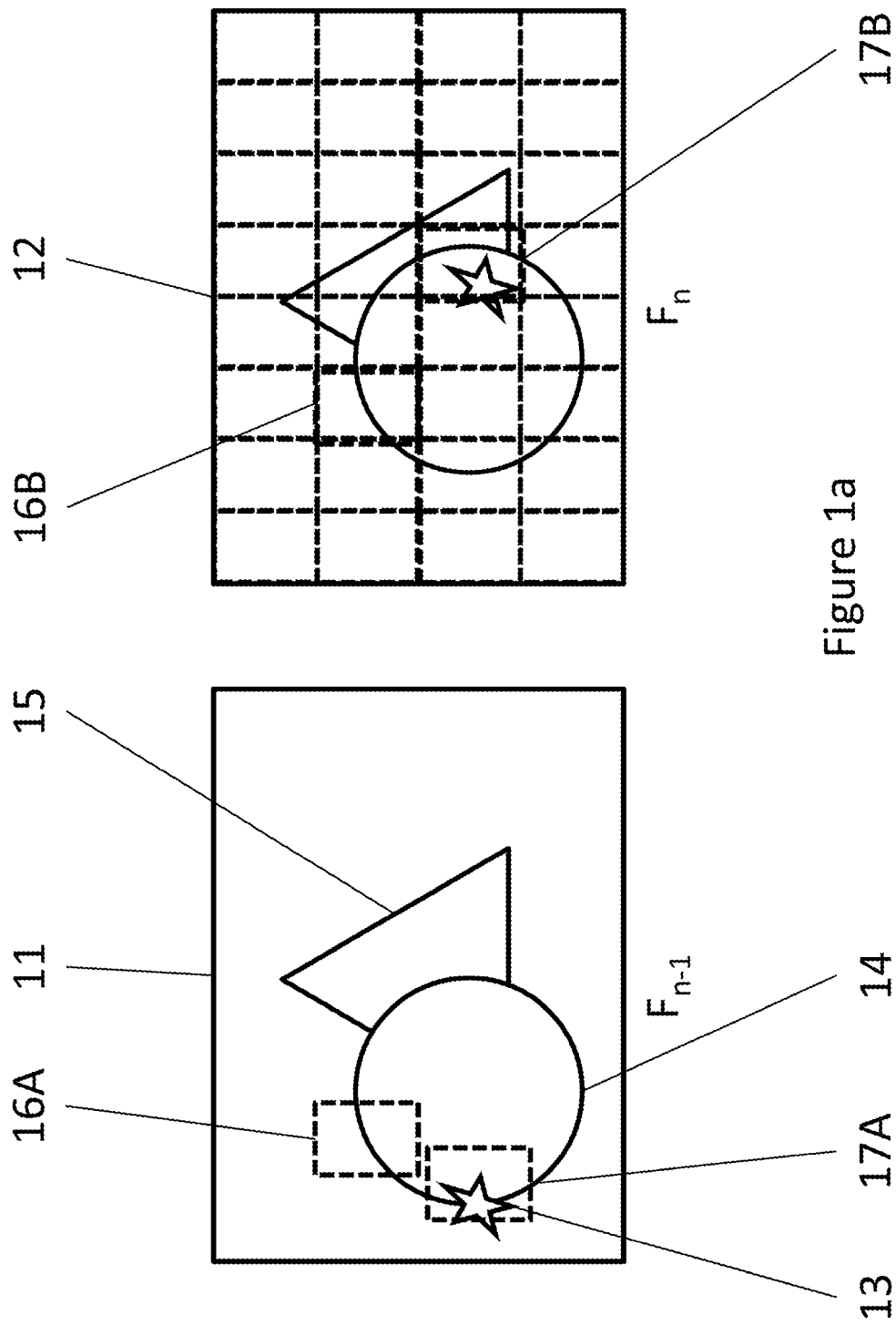
FIG. 1a shows two frames split into tiles.

Initially, an explanation of motion vectors and how they may be determined will be provided. Thus, FIG. 1a shows two successive frames, a previous frame $F_{n-1}$ [11] and a current frame $F_n$ [12]. Each of the frames includes three display objects: a triangle [15], a circle [14], and a star [13]. Between previous frame $F_{n-1}$ [11] and current frame $F_n$ [12], the display data in the frames has changed: the circle [14] and the star [13] have both moved to the right, the star [13] to a far greater degree than the circle [14]. The triangle [15] has not moved. The changes may be due to movements in a video clip or produced by an application that is producing the display data, or in a virtual-reality or augmented-reality system it may be due to user movement.

Current frame $F_n$ is shown with a grid of tiles. These are, in some implementations, units of transmission for the display data, and are also used as points of reference in embodiments of the invention. Two tiles [16B, 17B] are highlighted as examples, one tile [16B] containing a segment of the circle [14], the other tile [17B] containing the majority of the star [13].

The two frames [11, 12] are compared to one another. The previous frame $F_{n-1}$ [11] is searched in order to find best matches for the current tiles in the current frame $F_n$. A previous tile having the same size and shape and content is considered to be the best match for the display data in the current tile, regardless of whether the previous tile corresponds to the same location on a grid of the tiles. Thus, the previous tiles corresponding to the current tiles [16B, 17B] from current frame $F_n$ are shown highlighted [16A, 17A] in previous frame $F_{n-1}$.

Figure 1B:
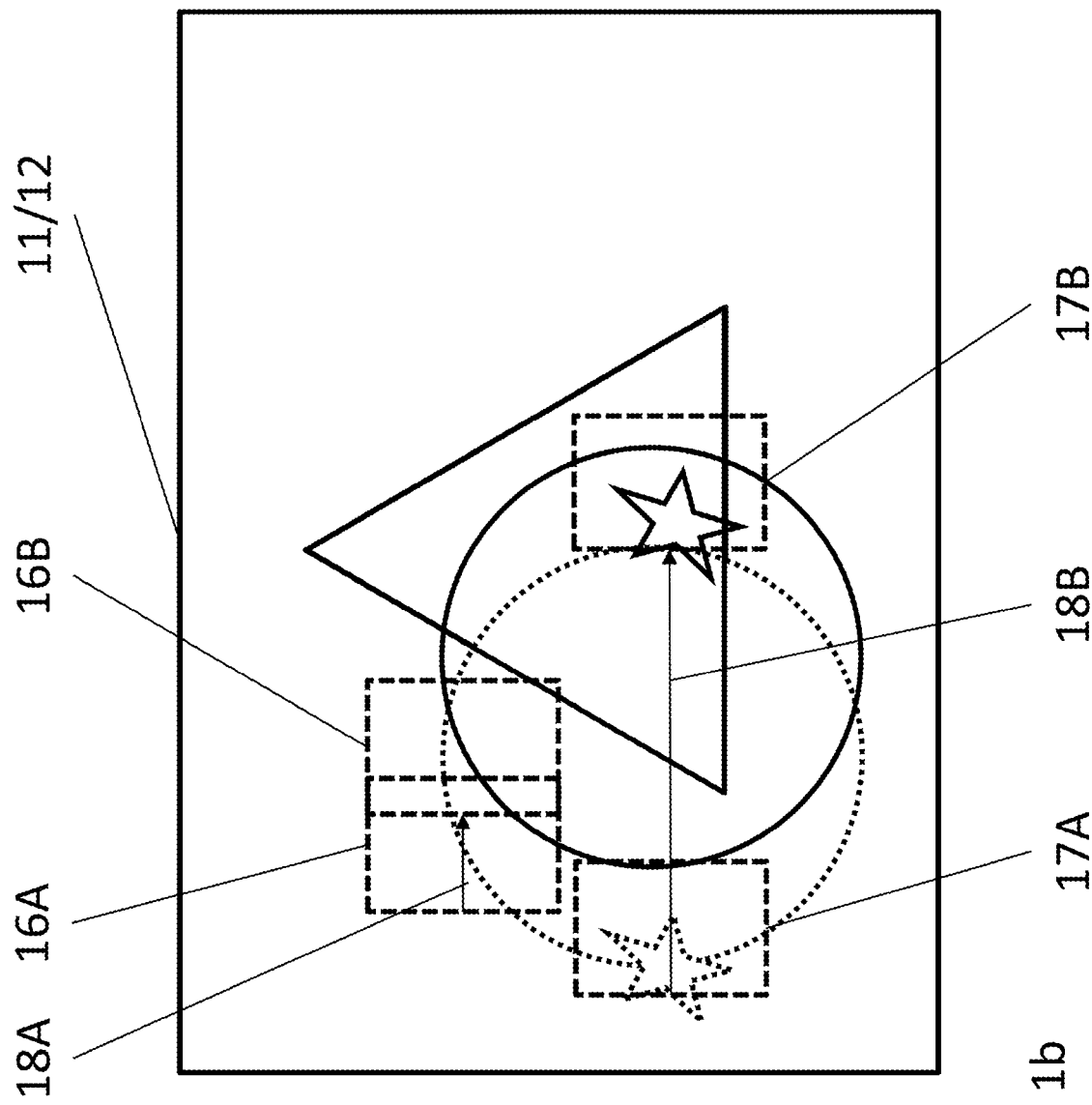
FIG. 1b shows two frames and the optical flow between them.

The comparison is shown in FIG. 1b, which shows motion vectors [18A, 18B] produced by comparing the two frames [11, 12] shown in FIG. 1a to one another. The previous image from previous frame $F_{n-1}$ [11] is shown in dotted lines while the current image from current frame $F_n$ [12] is shown in solid lines in order to illustrate the movement in the image between the frames. The current tiles [16B, 17B] and the corresponding previous tiles [16A, 17A] are shown outlined with dashed lines. Each previous tile [16A, 17A] is shown connected to its respective current tile [16B, 17B] with an arrow, which illustrates the motion vector [18A, 18B]. Since the circle does not move far, the motion vector [18A] between the current tile [16B] showing a segment of the circle [14] and its corresponding previous tile [16A] is shorter than the motion vector [18B] connecting the current tile [17B] showing the majority of the star [13] with its corresponding previous tile [17A].

In general, if the next frame $F_{n+1}$ is received in the normal way, then the motion vectors are not needed for the next frame (although they may be stored for some time). However, if the next frame $F_{n+1}$ is not received, or is received "damaged" or not in time when required, then an estimated next frame $F_{n+1}$ is generated in order to replace the "missing" next frame $F_{n+1}$ that was not received. As mentioned above, the "estimated" next frame $F_{n+1}$ has usually been generated by simply repeating the current frame $F_n$. However, this causes judder when a subsequent frame is received and various elements have then moved much further than they would have from the current frame being displayed.

Figure 1C:
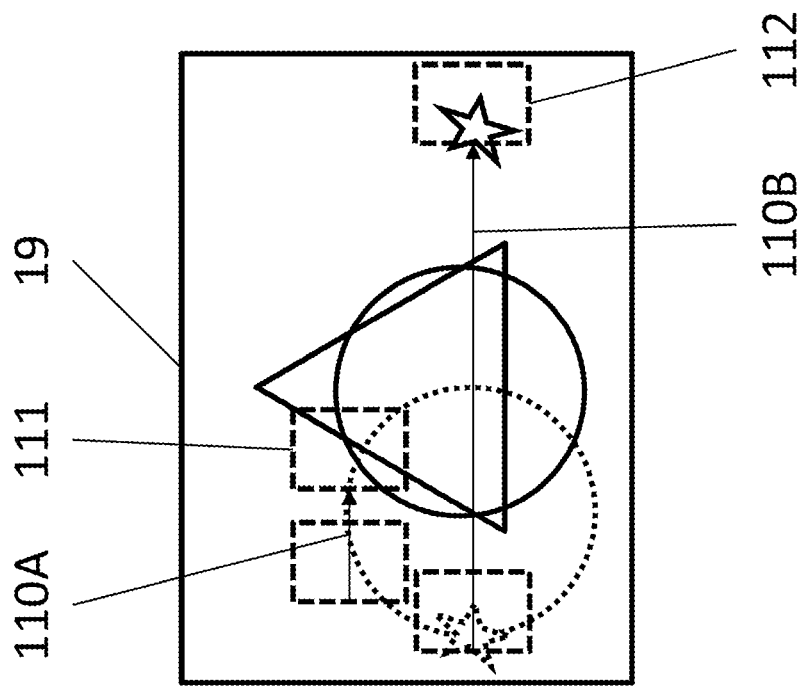
FIG. 1c shows an extrapolated frame and the extrapolated optical flow used to generate it.
Figure 1C:
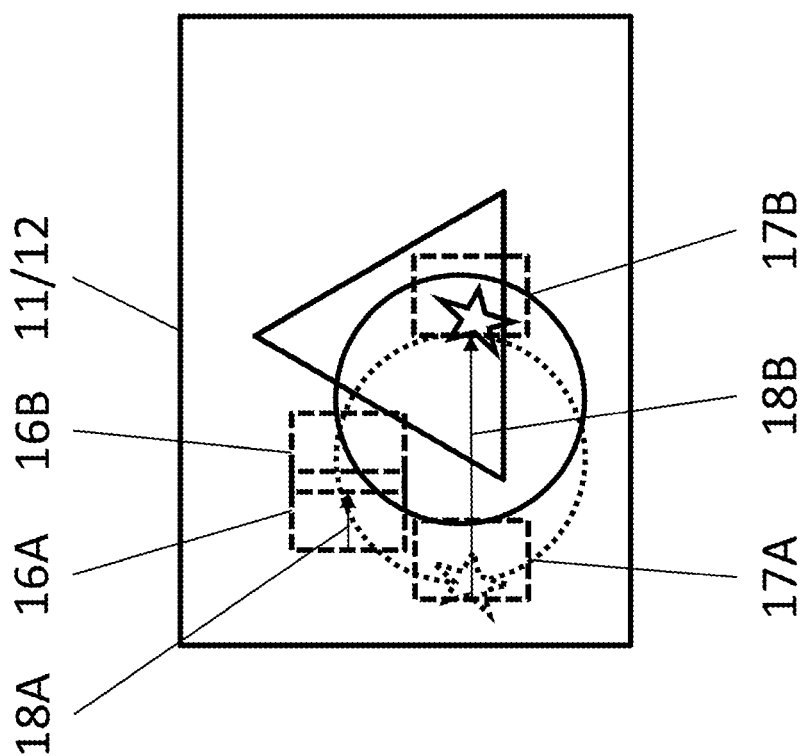

According to an embodiment of the invention, therefore, the motion vectors for the current frame $F_n$ are therefor used to estimate a next frame $F_{n+1}$ when the next frame $F_{n+1}$ has not been properly received. The current motion vectors [18] are used to estimate the positions of the display data with which they are associated in a next frame $F_{n+1}$, by extrapolating them. This is illustrated in FIG. 1c: on the left, the current motion vectors [18] described in FIG. 1b are shown, with the current tiles [16B, 17B] from current frame $F_n$ [12] and their corresponding previous tiles [16A, 17A] in frame $F_{n-1}$ [11]. On the right, the next motion vectors [18] are shown extended [110] to show the estimated new positions of the next tiles [111, 112] in the next frame $F_{n+1}$ [19]. This involves creating an estimated next motion vector using the current motion vectors [18] by extrapolating them. For the next frame $F_{n+1}$ the motion vectors are essentially the same length with the same angle as the previous motion vectors, since the previous motion vectors represent the movement in one frame from the previous Frame $F_{n-1}$ to the current frame $F_n$ and the next frame $F_{n+1}$ represents further movement in one frame from the current frame $F_n$ to the (estimated) next frame $F_{n+1}$.

However, if motion vectors for the previous frame $F_{n-1}$ have been stored, then extrapolation of the motion vectors can be done by comparing the motion vectors for the previous frame $F_{n-1}$ and the current frame $F_n$, and the difference between those motion vectors provides a more accurate estimate of how to adjust the motion vectors from current frame $F_n$ to estimate next frame $F_{n+1}$. For example, if the N−1 motion vector for an element has a length of 5 units and the N motion vector for the same element has a length of 3 units, then it will be seen that the difference between N−1 and N is 2 units, so that the difference between N and N+1 will be estimated to be 2 units, so that the elements for that motion vector will only be extended by two units as compared to the N motion vector. It will, obviously, be realised that this makes the estimate more accurate, since if the extrapolation was only based on the N motion vector, the slow down in the motion would not be calculated and the N+1 motion vector would be estimated as 3 units (the same as the N motion vector). On the other hand, if an N−2 motion vector is also stored, and, for example, has a length of 8 units, then it will be seen that the difference between N−2 and N−1 is 3 units, whereas the difference between N−2 and N is 2 units, so that the difference between N and N+1 will be estimated to be 1 unit, so that the elements for that motion vector will only be extended by one unit from the N motion vector. It will be apparent that the extrapolation may be carried out, not just for the sixe (length) of the motion vectors, but also their direction (angle) and any known method for carrying out the extrapolation may be used. For example, depending on the number of previous motion vectors being used, extrapolation could be done by applying a polynomial fit algorithm to a number of vectors from past frames to create a new estimated vector.

These estimated motion vectors [110] can be created for all the tiles in Frame $F_n$ and combined with the actual display data in Frames $F_{n-1}$ [11] and $F_n$ [12] to produce an estimated next frame $F_{n+1}$ [19], which is also shown in FIG. 1c. The star [13] and circle [14] have continued to move to the right, the star [13] at a greater rate than the circle [14].

Naturally, these methods can also be applied to partial updates of frames, where the host detects that only part of the image displayed has changed from one frame to the next and therefore only sends the different parts of a new frame.

In this case, the frames [11, 12, 19] described in FIGS. 1*a*, 1*b*, and 1*c* may be replaced by partial frames and/or the corresponding areas of full frames and the same methods applied.

Figure 2:
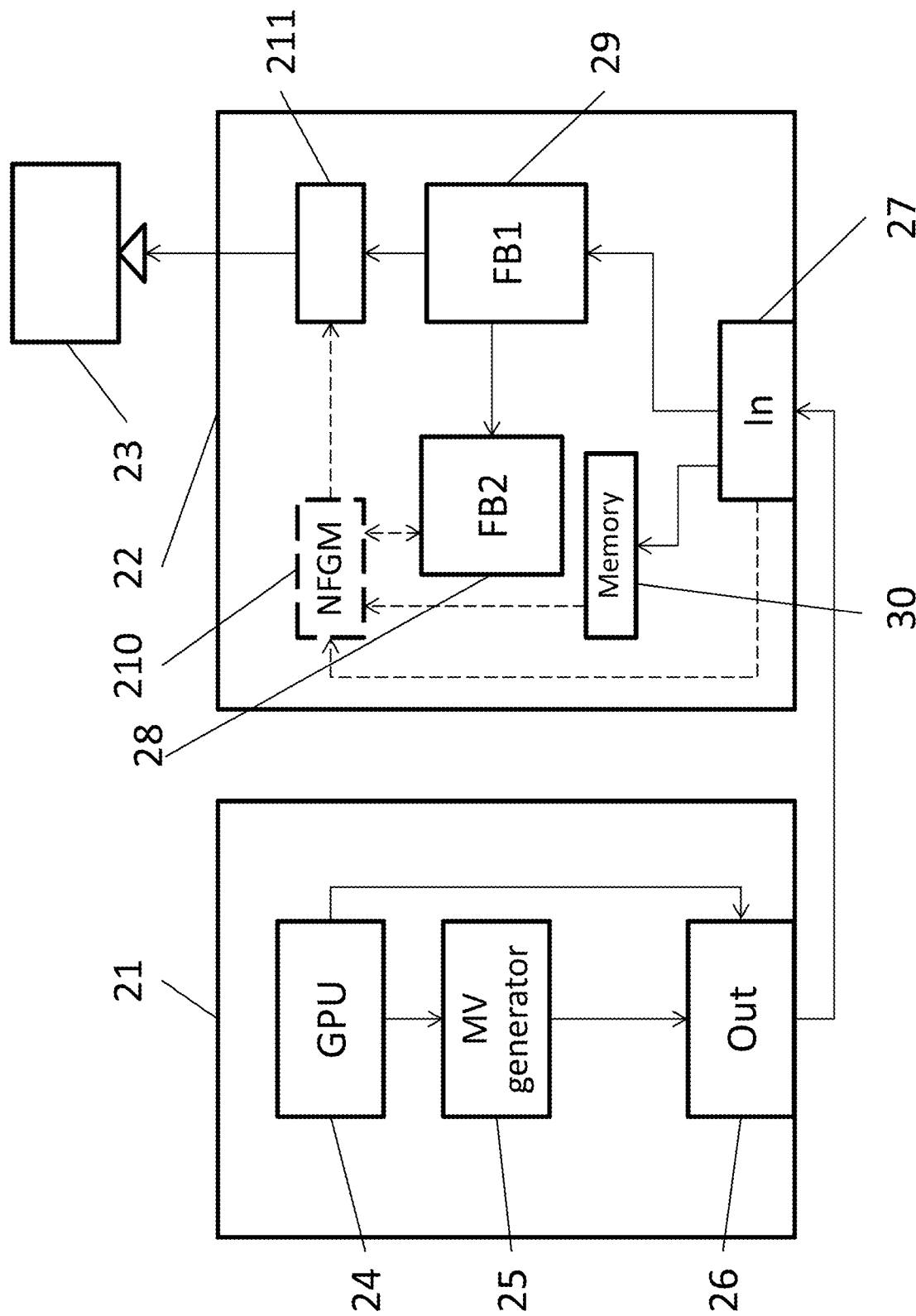
FIG. 2 shows a system in which the vectors are generated on the host.

FIG. 2 shows an example block diagram of a system according to one embodiment of the invention: in this example, a host computer [21] is connected to a display control device [22], such as, for example, a wireless docking station, which in turn may be connected to a display device [23]. Wireless connections can suffer from interference, which can cause data loss and sometimes loss of entire frames of display data. Currently, there is no mechanism for retrieving such display data; it must be re-sent or skipped, resulting in video output momentarily "freezing" and then "juddering" as a later frame that is not the missing frame is received and displayed.

In the system shown in FIG. 2, motion vectors between frames are calculated on the host computer [21] and transmitted to the display control device [22]. Often, these motion vectors are already calculated in the host device and used for frame generation on the host device. They are not normally transmitted to the display control device [22]. However, in this embodiment, they are transmitted, either together with the frame they relate to, or separately. Usually they will require a smaller amount of data than a frame and can easily be transmitted alongside each frame, so it is a low additional data overhead and is less likely to be lost or corrupted.

The host computer [21] contains a Graphics Processing Unit (GPU) [24], which produces frames of display data in accordance with instructions from applications running on the host computer [21]. The frames of display data are passed to an output module [26], which may include a driver for communication with the display control device [22], and may also control the wireless connection. to the GPU often uses motion vectors as part of the frame generation process, the motion vectors having been generated by the applications. In this case, those motion vectors can be output, together with the frame they relate to, to the output module [26] to be transmitted to the display control device [22]. Alternatively, if the motion vectors have not yet been generated, the current frame can be passed to a motion vector generation module [25], which stores the previous frame transmitted and compares a current frame to that previous frame in order to generate a set of motion vectors in the manner described above with reference to FIG. 1. This set of motion vectors is then passed to the output module [26] to be transmitted to the display control device [22] along with the display data, possibly in a preliminary set of packets.

Display data and motion vectors are received by an input engine [27] on the display control device [22], which controls the wireless connection as appropriate and handles incoming data. Accordingly, the input engine [27] is connected to a first frame buffer (FB1) [29] and also to a next frame generation module (NFGM) [210]. The first frame buffer FB1 [29] is connected to a display controller [211]. This receives frames of display data from FB1 [29] and transmits them to the display device [23] as appropriate. This may involve converting the data into a display-specific format. In general, therefore, when frames are properly received, they are input into the first frame buffer FB1 and then processed by the display controller [211] for output to the display device [23]. The current frame may also be sent from the first frame buffer [29] to a second frame buffer [28] in case it is needed for generating an estimated next frame. When the input engine receives the frames of display date, it transfers them, as mentioned, to the first frame buffer [29]. When the input engine [27] receives motion vectors, either together with or separately from a related frame, it passes those motion vectors on to a memory [28], where they are stored in case they are needed to generate the estimated next frame.

Thus, when a next frame to be displayed has not been received in time for it to be properly processed for display, it is necessary for an estimated next frame to be generated. The input engine [27], or possibly some other element of the display control device [22], such as the display controller [211], realises that the display data necessary for the next frame is not available for processing at the correct time. In this case a signal is sent to the NFGM [210] to enable it to generate an estimated next frame. The NFGM [210] can access the current frame display data from the second frame buffer [28] and the motion vectors for the current frame from the memory [30] and will the extrapolate the motion vectors and use them to generate the next frame to be displayed in the manner described above. Because the next frame generation module [210] may not always be used, this part of the system is shown with dashed lines. It will be appreciated that the next frame to be displayed will only need to be generated at the display control device [22] by the NGFM [210] if the next frame to be displayed is not received in time in the normal way for it to be properly processed for display.

Display data for the current may be copied to FB2 [28] only when it was data received from the host computer [21], although estimated frames generated by the next frame generation module [210] may also be copied into FB2 [28] to be used to generate a further next frame, in case two or more consecutive frames are not received properly and two or more successive estimated next frames need to be generated.

Figure 3:
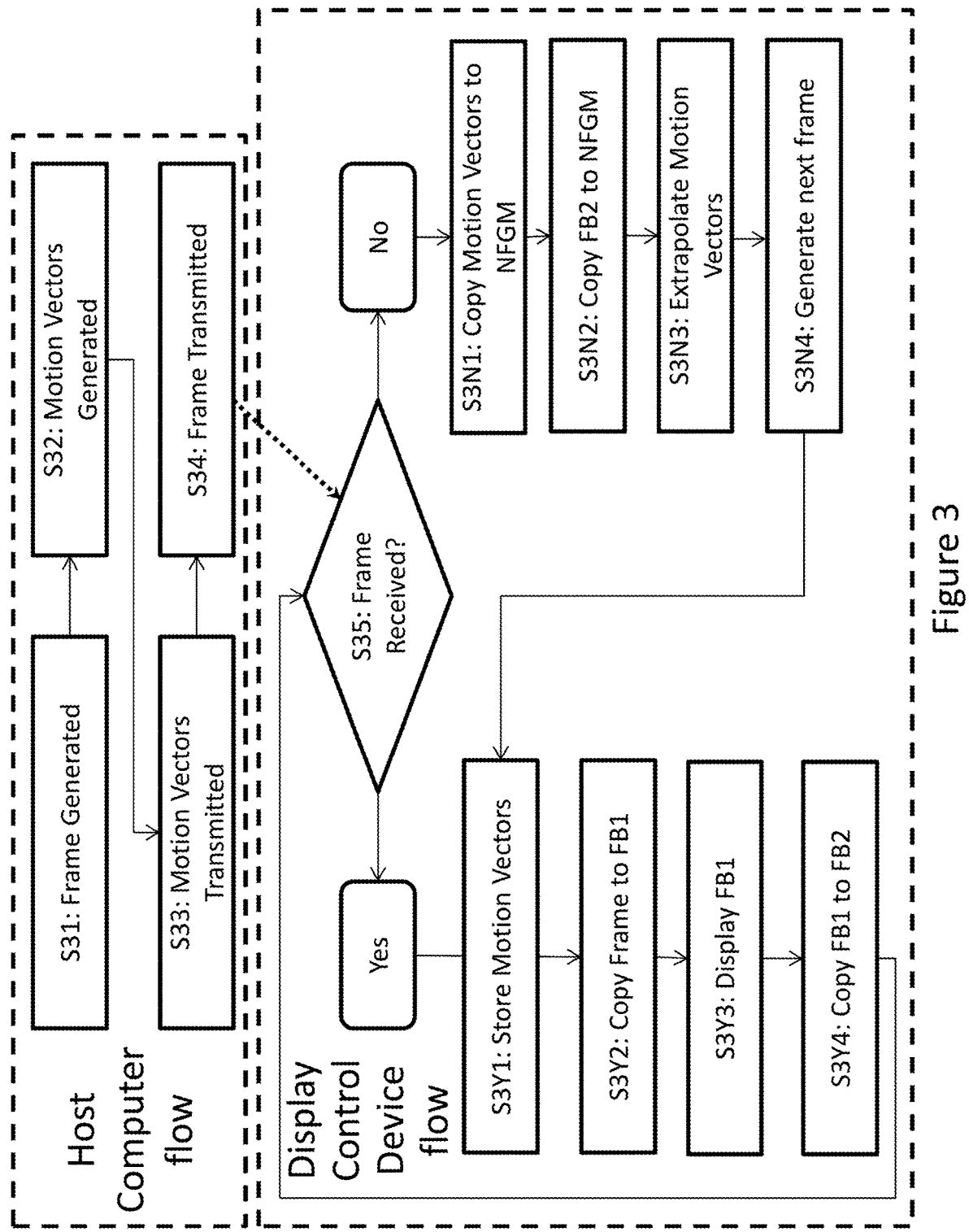
FIG. 3 shows the process used by the system in FIG. 2.

FIG. 3 shows the process followed by a first embodiment of the invention, showing the process flow at the host computer [21] and at the display control device [22].

The process flow at the host computer [21] commences at Step S31, where a current frame of display data (Fe) is generated in the GPU [24] as part of an ongoing stream of display data associated with, for example, playing a video through an application on the host computer [21]. As previously mentioned, the current frame is passed to both the output module [26] and the motion vector generation module [25].

At Step S32, in the case where the motion vectors were not previously generated, the motion vector generation module [25] receives the current frame Fe and analyses it as an array of tiles, which may be of equal size, or not. Each tile (termed reference tile) is compared in sequence to the previous frame $F_{n-1}$ using a search algorithm to find the best match of the pixels in the previous frame. The search area may comprise the whole of previous frame $F_{n-1}$, or may be smaller: e.g. 1 or 2 tiles away from the location of the reference tile. The location of the best match in previous frame $F_{n-1}$ compared to the reference tile in current frame $F_n$ is used to generate a motion vector comprising a length (representing distance moved) and a direction (representing angle of movement). Once all the tiles have been scanned, the result is an array of motion vectors showing the motion of each tile from previous frame $F_{n-1}$ to current frame $F_n$. The motion vector generation module [25] then sends this data to the output module [26], which transmits it to the input module [27] on the display control device [22] at Step S33. The display data making up current frame $F_n$ is also transmitted at Step S34, as represented by the dotted arrow leading to step S35 in the display control device process flow. In this embodiment, the motion vectors precede the display data. In other embodiments, the data may be interleaved, the motion vectors may be sent after the display data, or a combination may be used such as the motion vectors being sent twice, at the beginning and end of the display data. It will also be appreciated that the motion vectors may have been generated prior to the display data for the frame, and the motion vectors may not, therefore be generated at the computer by comparing the current and previous frames as described for this embodiment.

Turning, then, to the display control device process flow, the input engine [27] can detect the type of data, for example by reading packet headers, and to check the completeness of frames received. It may do this by counting a number of packets and comparing this to a count transmitted by the host computer or to a known count of the expected number of packets in a frame, or by transmitting packets directly to frame buffer FB1 [29] and checking when it reaches the end of the signal whether the frame buffer [29] is full. Accordingly, at Step S35 it determines whether it has received a full frame, or a sufficient portion of a frame.

The ideal case is that the input engine [27] has received a full frame. In this case, the process follows the branch on the left, beginning at "Yes".

At Step S3Y1, the motion vectors that are received with the frame (before, after or interleaved with) are stored in the memory [30]. In step S3Y2, the input engine [27] copies the current frame $F_n$ to FB1 [29]. As previously mentioned, this copying may be carried out while the data is being received, or alternatively the whole frame may be accumulated in the input engine [27] and copied to the frame buffer [29] once it has been received.

At Step S3Y3, the display controller [211] processes the display data from the frame buffer FB1 [29]. The display controller [211] is coupled to the first frame buffer [29] and may actively transmit the display data, or the input engine [27] may send a signal to the display controller [211] alongside copying the display data to FB1 [29] to indicate that a frame has been received and the display controller [211] should receive data from the first frame buffer [29], in which case the display controller [211] could fetch data from the first frame buffer [29].

In any case, the display controller [211] processes and transmits the display data to the display device [23], where it is displayed in the conventional way.

Finally, at Step S3Y4, the current frame $F_n$ is copied from the first frame buffer FB1 [29] to the second frame buffer FB2 [28] for future use if necessary.

This process will repeat itself as long as display data is being produced, on the host computer [21], and properly received, at the display control device [22], the part of the process carried out on the host computer [21] being largely independent of the part of the process being carried out on the display control device [22], such that they repeat separately from one another.

If the input engine [27] (or another element of the display control device [22]) determines at Step S35 that a complete new frame has not been properly received, the process follows the branch to the right, beginning at "No".

At Step S3N1, the motion vectors that have previously been stored in the memory [30] are accessed by the NFGM [210]. In step S3N2, the next frame generation module [210] accesses and fetches the display data comprising the current frame $F_n$ from the second frame buffer [29]. Either before or after fetching the display data from the second frame buffer, the NFGM [210] extrapolates (indicated by step S3N3) the motion vectors and then combines the extrapolated motion vectors with the display data comprising current frame $F_n$ as previously described with reference to FIG. 1c to generate the next frame $F_{n+1}$, as indicated at step S3N4. Although step S3N3 is illustrated as taking place after step S3N2, it will be appreciated that they can be performed in either order, or simultaneously. Thus, the received motion vectors are extrapolated in order to determine how various parts of the image, i.e. on various tiles, might be expected to have moved from the current frame to the next frame. This produces an estimated next frame $F_{n+1}$. Although it will be understood that the estimated next frame $F_{n+1}$ is unlikely to be identical to the original, lost next frame $F_{n+1}$, it will be sufficiently similar to fill the gap until a subsequent frame, hopefully the next subsequent frame $F_{n+2}$ is received, thereby reducing any judder. If motion vectors for one or more previous frames are also stored in the memory [30], then they may also be accessed and used by the NFGM [210] to increase the accuracy of the extrapolated motion vectors used to generate the estimated next frame. Furthermore, the extrapolated motion vectors can also be stored in the memory to be used, if necessary in place of "missing" actual motion vectors. Whether or not extrapolated motion vectors are used subsequently may depend on their level of accuracy, for example, depending on how many "real" motion vectors were used to generate them.

Once the estimate next frame has been generated at Step S3N4, the process moves back to step S3Y1, where the (extrapolated) motion vectors are stored in the memory and the process continues in the same way as if the estimated next frame had been received as the next frame. Thereafter, the process returns to step S35 to see whether a subsequent next frame has been received. Alternatively, the display controller [211] may receive the estimated next frame $F_{n+1}$ directly from the NFGM [210]. It may either fetch it from an internal buffer if signalled to do so by the input engine [27], as previously suggested, or the NFGM [210] might transmit the display data to it. The next frame $F_{n+1}$ is then displayed in the conventional way.

This method helps to fill the gap where one frame has been lost, but could be used to create any number of frames if the estimated next frame $F_{n+1}$ is copied to frame buffer FB2 [28] for use as the previous frame in the next iteration of the process. This will, of course, require the motion vectors to be extrapolated further and will therefore lead, in most applications to increasing inaccuracy as areas of the display data which did not in fact move according to the motion vectors, will not be corrected. Nevertheless, it may be beneficial to do this for at least a few frames, rather than letting a large judder build up.

Figure 4:
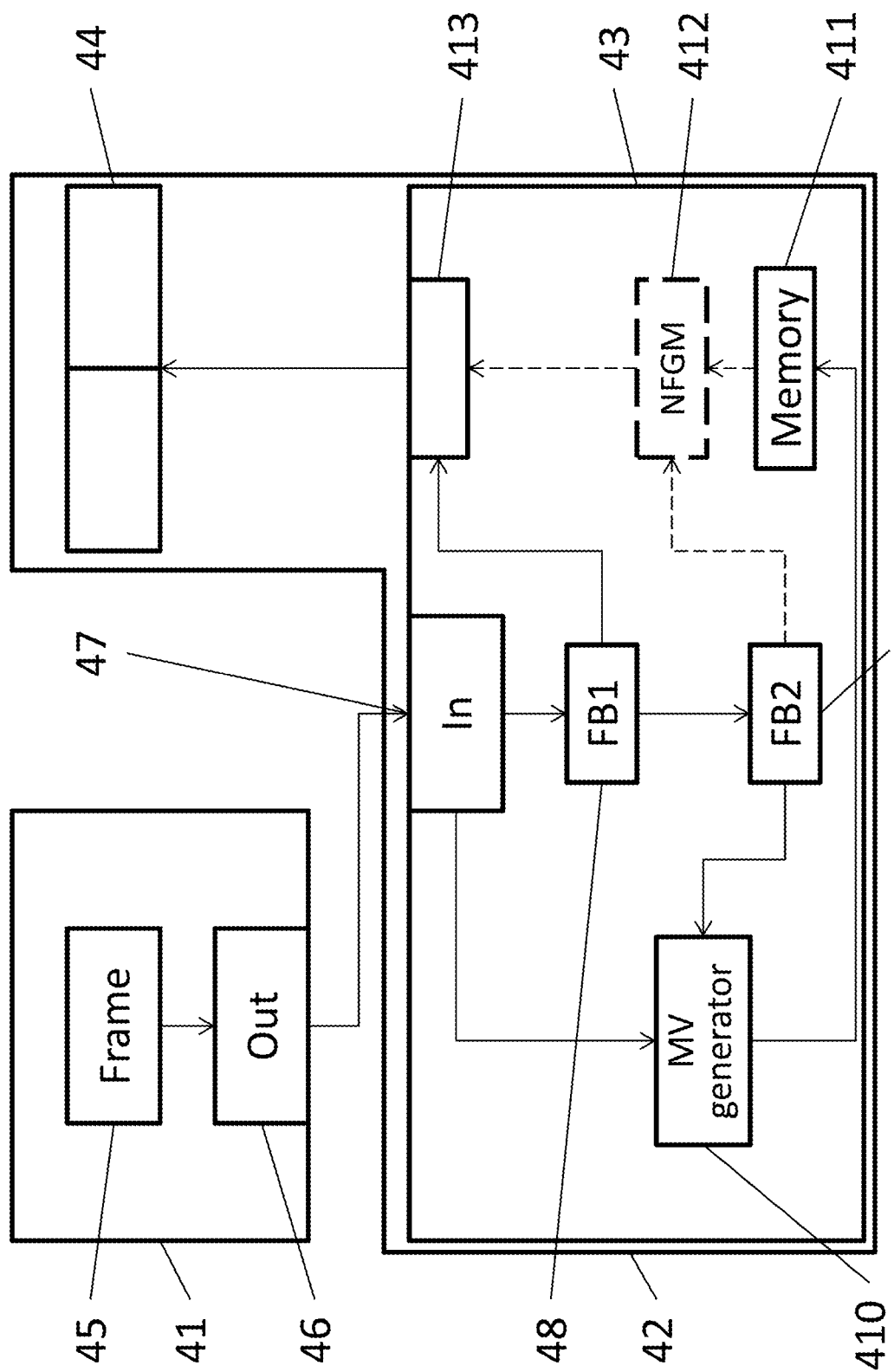
FIG. 4 shows a system in which the vectors are generated on the display control device.

FIG. 4 shows an alternative embodiment, in which motion vector generation is carried out on a display control device [43] rather than on the host computer [41]. In this example, the host computer [41] may be a gaming console which is wirelessly connected to a virtual-reality headset [42] which incorporates a pair of display panels [44] which, in use, are each presented to one of a user's eyes. In this case, the display panels [44] and the display control device [43] are both housed in a single casing [42].

As in the system described with reference to FIG. 2, the host computer [41] includes a GPU [45] which produces frames of display data. These are passed to an output module [46] which controls the wireless connection to the headset [42] and prepares the display data for transmission to the headset [42], but in this embodiment there is no motion vector generation module in the host computer [41].

The wireless connection is between the output module on the console [41] and an input engine [47] on the headset

[42]. This input engine [47] operates similarly to that described with reference to FIG. 2, but it will not receive motion vectors from the host computer [41]. Instead, it is connected to a motion vector generation module [410] in the display control device [43] as well as the first frame buffer FB1 [48].

As in the previous embodiment, the first frame buffer FB1 [48] is connected to a second frame buffer FB2 [49] and a display controller [413] which processes and transmits display data to the display panels [44] for display. The second frame buffer FB2 [49] in this embodiment stores the previously-received and/or displayed frame, as well as the current frame. The second frame buffer is connected to both the motion vector generation module [410] and a next frame generation module (NFGM) [412].

The motion vector generation module [410] receives display data from both the input module [47] and the second frame buffer FB2 [49]. Alternatively, it might receive newly-received data from FB1 [48], but in either case it compares the display data from the current frame with the display data from the previous frame in order to generate a set of motion vectors, which it sends to a memory [411]. This memory [411] might be a dedicated area of memory for motion vectors, or it might be part of the memory used for the rest of the operation of the display control device [43].

As before, if a current frame is properly received and stored in the first frame buffer, it is processed and transmitted by the display controller to the display panels 44. In this embodiment, motion vectors are generated by the motion vector generation module [410] for the current frame that has been received and the motion vectors are stored in the memory [411] in case they are needed.

If a next frame is not properly received, the NFGM [412] obtains data from both FB2 [49] and the motion vector memory [411]. Since it will only operate when no next frame has been received, the data connections to the NFGM [412] and the NFGM [412] itself are shown with dashed lines. The NFGM [412] uses display data from FB2 [49] and the motion vectors from the vector memory [411] to extrapolate the motion vectors, in the same way as was described with reference to the previous embodiment, and to generate an estimated next frame and transmit it to the display controller [413] when required as well as copying it to FB2 [49].

Figure 5:
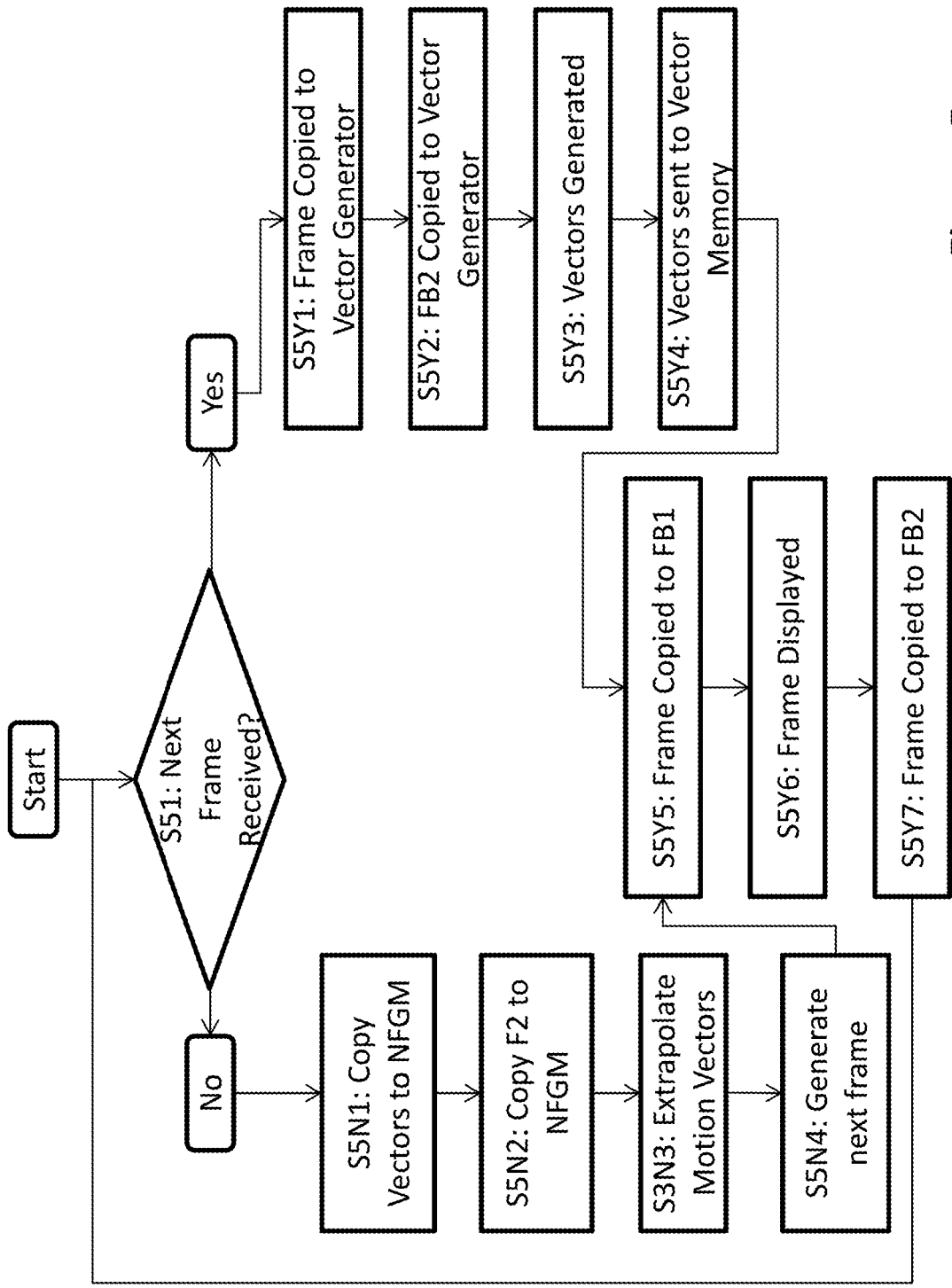
FIG. 5 shows the process used by the system in FIG. 4.

FIG. 5 shows the process followed by the embodiment of the display control device [42] shown in FIG. 4, beginning with step S51, where it is determined whether a current frame $F_n$ has been properly received by the input engine [47] in the display control device [43] as part of an ongoing stream of display data.

If, at Step S51, it is determined that the current frame $F_n$ is properly received, the process follows the right hand branch marked "Yes", but if the current frame $F_n$ is not properly received, the process follows the left hand branch marked "No". Since the host computer [41] does not transmit motion vectors in this embodiment, the input engine [47] does not need to be able to determine data type, though it may do so for other purposes connected to other parts of the operation of the headset [42]. If the current frame $F_n$ is properly received, so that the process follows the right hand branch marked "Yes", the process then proceeds to Step S5Y1, which will be described first.

At step S5Y1, the received frame $F_n$ is copied to the motion vector generation module [410]. As previously mentioned, it may be copied as a whole frame from the input engine [47], or the input engine [47] may send it piece by piece to build up a frame in the motion vector generator [410]. Alternatively, it may be copied from FB1 [48] once the input engine [47] has stored it there.

At Step S5Y2, the previous frame $F_{n-1}$ stored in FB2 [49] is copied to the motion vector generator [410]. This is the frame preceding frame $F_n$ and it may have been generated in the display control device [43] or received from the host computer [41]. At Step S5Y3, it is compared to frame $F_n$ to generate a set of motion vectors as previously described. These motion vectors are stored in the motion vector memory [411] at Step S5Y4.

At Step S5Y5, the received frame is copied to the first frame buffer FB1 [48]. This may be carried out as packets of display data are received, or the input engine [47] may collect the entire frame and copy it as a whole frame. The latter will be especially useful where the input engine [47] is also responsible for copying the display data to the vector generation module [410], as in the embodiment shown with reference to FIG. 4.

At Step S5Y6, the frame is displayed in the conventional way: the display controller [411] processes display data from FB1 [48], converts it to a display-specific transmission format if necessary, and transmits it to the display panels [44] for display.

At Step S5Y7, the frame is copied from FB1 [48] to FB2 [49] as previously described, so that it can be used for generation of later estimated frames if required.

The process then returns to Step S51 and repeats itself with a determination as to whether a subsequent next frame $F_{n+1}$ is received. It will be appreciated that although the process has been described with steps S5Y5 to S5Y7 following steps S5Y1 to S5Y4, it is possible to may carry out steps S5Y5 to S5Y7 before steps S5Y1 to S5Y4 or to carry out steps S5Y5 to S5Y7 simultaneously with steps S5Y1 to S5Y4.

If, on the other hand, at Step S51, the input engine [47] determines that it has, in fact, received a different frame from the one required, or nothing, or an insufficient portion of the next frame $F_{n+1}$, the process moves to the left hand branch marked "No". Unlike the embodiment shown in FIG. 3, this method could operate even if no data is received for frame $F_{n+1}$ at all, since the host computer [41] does not transmit motion vectors to the headset [42].

At Step S5N1, the input engine [47] sends a signal to the NFGM [412] to fetch the motion vectors from motion vector memory [411] and it does so. Alternatively, the input engine [47] could signal a controller attached to the motion vector memory [411] to transmit the motion vectors to the NFGM [412].

At Step S5N2, the data comprising current frame $F_n$ is likewise copied from the frame buffer FB2 [49]. As with the motion vectors, this might be carried out by the NFGM [412] or by a controller attached to FB2 [49], in accordance with signals from the input engine [47].

At Step S5N3, motion vectors are extrapolated from the motion vectors stored in the memory, as previously described. The display data in current frame $F_n$ is then generated from the extrapolated motion vectors in step S5N4, in the same way as described with reference to the previous embodiment. The process then moves to step S5Y5, where the resulting estimated next frame $F_{n+1}$ is copied to FB1, then transmitted to or requested by the display controller [413] and sent for display in the conventional way at Steps S5Y6 and S5Y7 in the manner described above for a properly received frame, and then returns to step S51.

As previously mentioned, this method is designed to fill the gap where one frame has been lost, but could be used to create any number of frames if the generated estimated next frame $F_{n+1}$ is copied to frame buffer FB2 [49] for use as the previous frame in the next iteration of the process. However, in most applications this will lead to increasing inaccuracy as areas of the display data which did not in fact move according to the motion vectors will not be corrected.

Figure 6A:
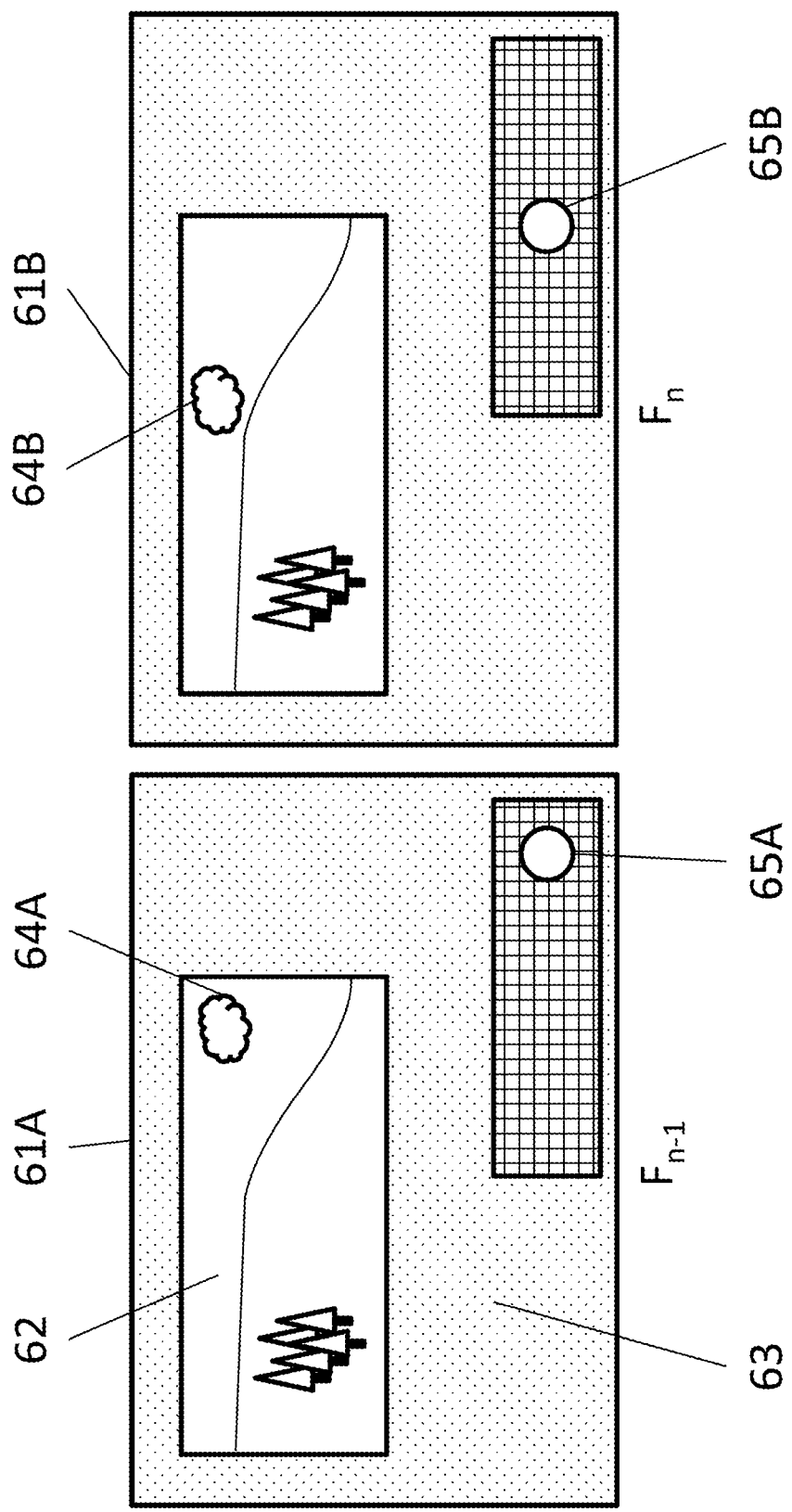
FIGS. 6a, 6b and 6c show examples of movement between only some elements in a frame in a further embodiment of the invention.
Figure 6B:
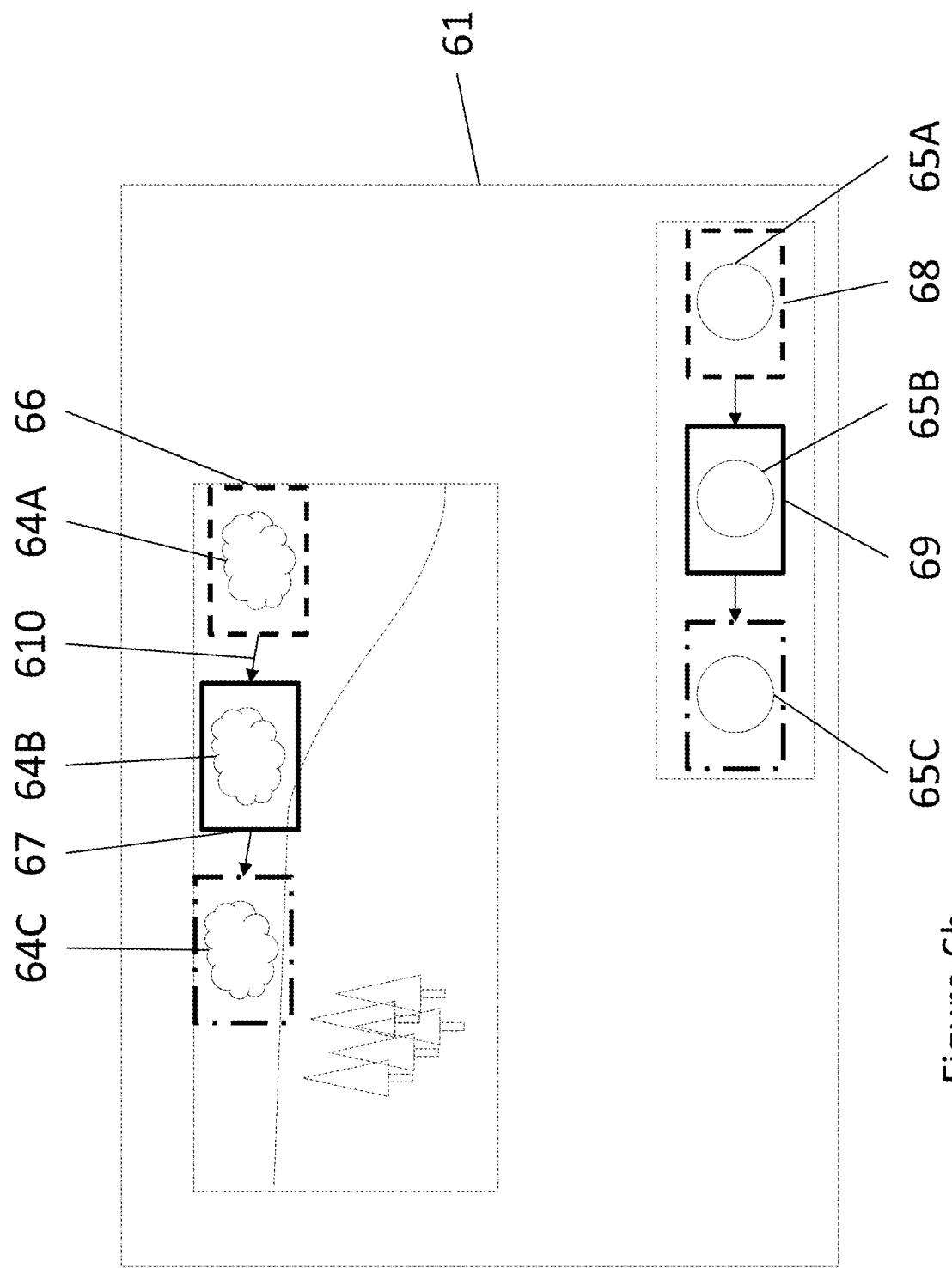
Figure 6C:
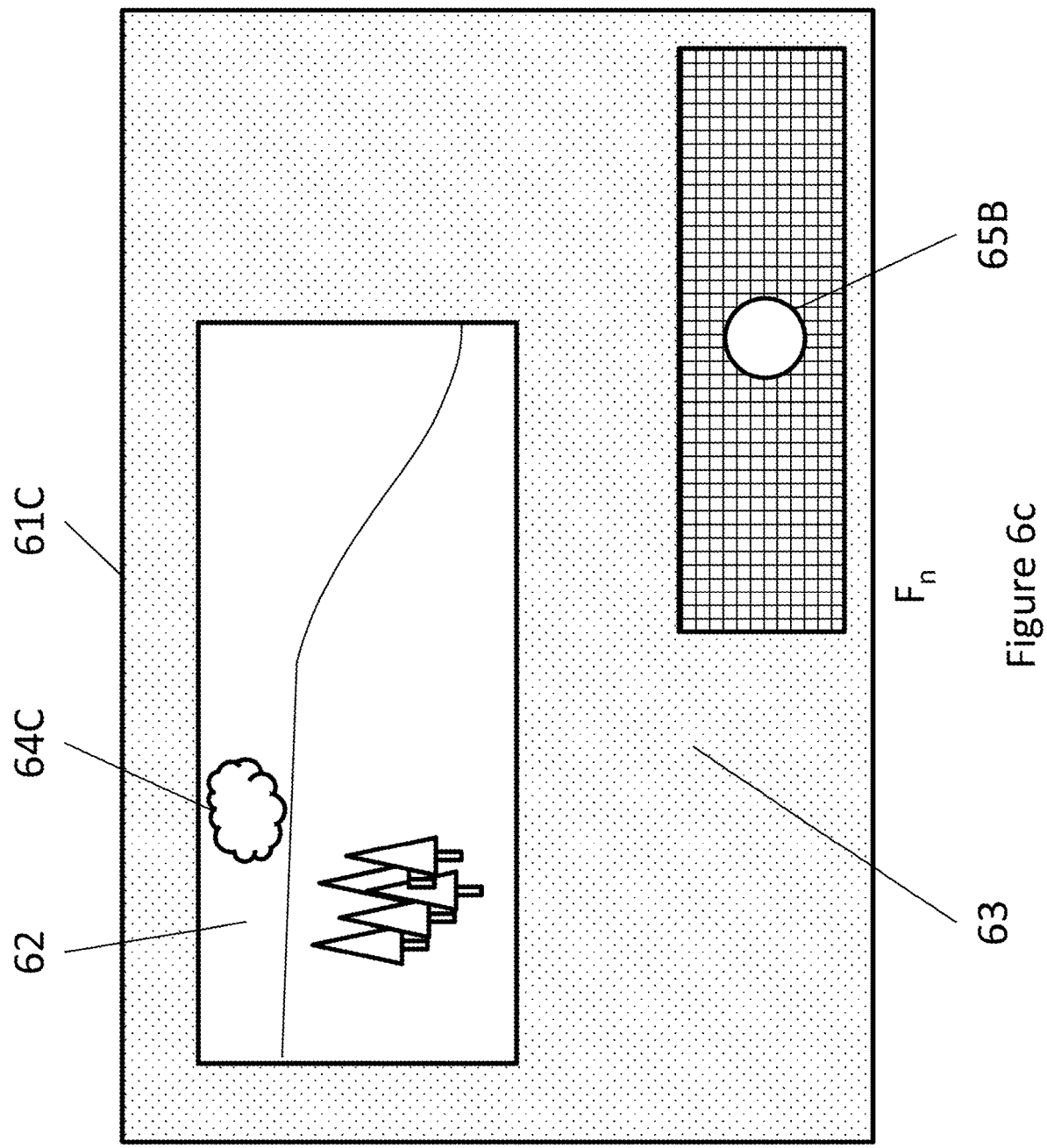

In a further embodiment of the invention the method may also be applied on parts of frames if such an application is suggested by the nature of the display data. FIGS. 6a, 6b, and 6c show an example of this variation.

FIG. 6a, similarly to FIG. 1a, shows two successive frames, $F_n$ [61B] and $F_{n-1}$ [61A]. In this case, however, the frames [61] have an area of high contrast [62] and an area of low contrast [63]. Movement and change between frames [61] will be significantly more obvious in the area of high contrast [62], and therefore it is more important to reduce judder in this area compared to the area of low contrast [63].

In the example shown in FIG. 6a, there have been changes in both the high-contrast [62] area and the low-contrast area [63]. In the high-contrast area [62], a cloud [64] has moved to the left, and in the low-contrast area [63] a circle [65] in the lower-right-hand corner has moved to the left. The motion vectors associated with these movements are shown more clearly in FIG. 6b.

FIG. 6b shows the two frames [61] superimposed on one another outlined with fine dashed lines and with the shading removed for clarity. The only differences between the frames [61] are the movements of the cloud [64] and the circle [65]. The reference tiles for the cloud [67] and the circle [69] in Frame $F_n$ [61B] are shown with solid outlines and their corresponding previous tiles [66, 68] in Frame $F_{n-1}$ [61A] are outlined using heavy dashed lines. Comparison between these locations [66, 67, 68, 69] produces motion vectors [610] to represent how the display data from Frame $F_{n-1}$ has moved to produce Frame $F_n$, as previously described.

These vectors [610] can be used as previously described to produce estimated locations for the cloud [64C] and the circle [65C] in a next estimated frame $F_{n+1}$ using extrapolated motion vectors. However, in an embodiment, this method is only applied in the area of high contrast [62], since this is where movement will be most noticeable and therefore where judder will be most obtrusive. This will produce the frame $F_{n+1}$ [61C] shown in FIG. 6c, in which the cloud [64C] has moved to a new estimated location, but the circle [65B] remains in the same location it occupied in Frame $F_n$.

This method can be used in both of the above described systems, where this method may involve analysing the frames [61] to identify the high-[62] and low-contrast [63] areas, generating the motion vectors for the whole frame [61], and then only using those for the high-contrast area [62]. Alternatively, it may involve only generating the motion vectors for the high-contrast area [62], or only extrapolating motion or only extrapolating the motion vectors for the high contrast area [62], which will require less time. Either system may switch between any of these methods and the method by which motion vectors are used for the whole frame, depending on, for example, processing power available, or the time available for frame generation.

Although only a few particular embodiments have been described in detail above, it will be appreciated that various changes, modifications and improvements can be made by a person skilled in the art without departing from the scope of the present invention as defined in the claims. For example, hardware aspects may be implemented as software where appropriate and vice versa. Furthermore, although the embodiments have been described as generating the next frame from the current frame $F_n$, it will be appreciated that if the current frame was not received properly, the next frame can be generated from a previous frame a previous frame $F_{n-m}$, where m=1, 2, 3, etc, whereby increasingly old received frames may be used to generate the missing next frame if intervening frames were also not received, for example.

The invention claimed is:

1. A method for mitigating motion judder in frames of an image to be displayed on a display device, the method comprising:
    receiving, over a transmission medium, display data for at least a current frame n;
    generating at least the current frame n from the received display data;
    one or more first motion vectors for at least some elements of the image in the current frame n;
    determining that display data for a next frame n+1 is not available to process;
    extrapolating one or more second motion vectors from the one or more first motion vectors or from one or more motion vectors for the at least some elements of the image in a previous frame n–m responsive to determining that the display data for the next frame n+1 is not available to process, where m≥1;
    adjusting the current frame n or the previous frame n–m based on the one or more second motion vectors; and
    generating the next frame n+1 based on the adjusted frame.

2. A method according to claim 1, wherein obtaining the one or more first motion vectors comprises receiving the one or more first motion vectors for the current frame n together with the display data for the current frame n.

3. A method according to claim 1, wherein obtaining the one or more first motion vectors comprises determining the one or more first motion vectors for the current frame n by comparing positions of the at least some elements of the image in the current frame n with positions of the at least some elements of the image in a previous frame n–1.

4. A method according to claim 1, wherein the one or more second motion vectors are extrapolated prior to determining whether the display data for a next frame n+1 is available to process and stored in a memory to be used responsive to determining that the display data for the next frame n+1 is not available to process.

5. A method according to claim 1, wherein the one or more second motion vectors are extrapolated using motion vectors from at least some elements of the image in the current frame n and from motion vectors from the at least some elements of the image in at least one previous frame n–m, where m≥1.

6. A method according to claim 1, further comprising determining whether the image has an area that has a contrast level below a predetermined threshold and motion vectors are not obtained for the area.

7. A method according to claim 1, further comprising determining whether the image has an area that has a contrast level below a predetermined threshold and wherein the one or more second motion vectors are not extrapolated for the area.

8. A method according to claim 1, further comprising determining whether the image has an area that has a contrast level above a predetermined threshold and motion vectors are only obtained for the area.

9. A method according to claim 1, further comprising determining whether the image includes an area that has a contrast level above a predetermined threshold and wherein the one or more second motion vectors are only extrapolated for the area.

10. A client device comprising:
   an input engine configured to receive display data for at least a current frame n from a host device and to obtain one or more first motion vectors for at least some elements of an image in the current frame n;
   a first frame buffer connected to the input engine, the first frame buffer configured to store at least the current frame n generated from the received display data;
   a display controller connected to the first frame buffer, the display controller configured to process the current frame n from the first frame buffer and transmit the processed current frame n to a display device for display thereon, and to determine that a next frame n+1 is not available at the first frame buffer to process; and
   a next frame generation module coupled to the input engine and the display controller, the next frame generation module configured to:
      extrapolate one or more second motion vectors from the one or more first motion vectors or from one or more motion vectors for the at least some elements of the image in a previous frame n−m responsive to the display controller determining that the next frame n+1 is not available at the first frame buffer to process, where m≥1;
      adjust the current frame n or the previous frame n−m based on the one or more second motion vectors; and
      generate the next frame n+1 based on the adjusted frame.

11. A client device according to claim 10, wherein the client device comprises a Virtual Reality or an Augmented Reality device to be worn by a user.

12. A client device according to claim 10, wherein the one or more first motion vectors are obtained by receiving the one or more first motion vectors for the current frame n at the input engine together with the display data for the current frame n.

13. A client device according to claim 10, further comprising a motion vector generation module and a second frame buffer, wherein the one or more first motion vectors are obtained by determining, at the client device, wherein the second frame buffer is configured to store a previous frame n−1 and the current frame n and the motion vector generation device is configured to generate the one or more first motion vectors for the current frame n by comparing positions of the at least some elements of the image in the current frame n with positions of the at least some elements of the image in the previous frame n−1.

14. A client device according to claim 10, wherein the one or more second motion vectors are extrapolated at the client device prior to determining whether the display data for a next frame n+1 is available to process and stored in a memory at the client device to be used responsive to the display controller determining that the display data for the next frame n+1 is not available to process.

15. A client device according to claim 10, wherein the one or more second motion vectors are extrapolated using motion vectors from at least some elements of the image in the current frame n and from motion vectors from the at least some elements of the image in at least one previous frame n−m, where m≥1.

16. A client device according to claim 10, further configured to determine that the image has an area that has a contrast level below a predetermined threshold and wherein the motion vectors are not obtained for the area.

17. A client device according to claim 10, further configured to determine that the image has an area that has a contrast level below a predetermined threshold and wherein the one or more second motion vectors are not extrapolated for the area.

18. A client device according to claim 10, further configured to determine that the image has an area that has a contrast level above a predetermined threshold and wherein the motion vectors are only obtained for the area.

19. A client device according to claim 10, further configured to determine that the image includes an area that has a contrast level above a predetermined threshold and wherein the one or more second motion vectors are only extrapolated for the area.

20. A display system, comprising:
   a host device; and
   a client device comprising:
      an input engine configured to receive display data for at least a current frame n from the host device and to obtain one or more first motion vectors for at least some elements of an image in the current frame n;
      a first frame buffer connected to the input engine, the first frame buffer configured to store at least the current frame n generated from the received display data;
      a display controller connected to the first frame buffer, the display controller configured to process the current frame n from the first frame buffer and transmit the processed current frame n to a display device for display thereon, and to determine that a next frame n+1 is not available at the first frame buffer to process; and
      a next frame generation module coupled to the input engine and the display controller, the next frame generation module configured to:
         extrapolate one or more second motion vectors from the one or more first motion vectors or from one or more motion vectors for the at least some elements of the image in a previous frame n−m responsive to the display controller determining that the next frame n+1 is not available at the first frame buffer to process, where m≥1;
         adjust the current frame n or the previous frame n−m based on the one or more second motion vectors; and
         generate the next frame n+1 based on the adjusted frame.

* * * * *

UNITED STATES PATENT AND TRADEMARK OFFICE
CERTIFICATE OF CORRECTION

| | |
|---|---|
| PATENT NO. | : 11,606,481 B2 |
| APPLICATION NO. | : 16/635271 |
| DATED | : March 14, 2023 |
| INVENTOR(S) | : Trevor Hall |

It is certified that error appears in the above-identified patent and that said Letters Patent is hereby corrected as shown below:

In the Claims

In Column 12, Line 17, in Claim 1, delete "one or more first motion vectors for at least some elements" and insert -- obtaining one or more first motion vectors for at least some elements --

Signed and Sealed this
Eighteenth Day of April, 2023

*Katherine Kelly Vidal*

Katherine Kelly Vidal
*Director of the United States Patent and Trademark Office*